United States Patent
Shanmugam et al.

(10) Patent No.: US 11,781,057 B2
(45) Date of Patent: Oct. 10, 2023

(54) AMPHIPHILIC BLOCK COPOLYMER SURFACTANT FOR ATTENUATING ACID REACTIVITY DURING ACID STIMULATION OF CARBONATE RICH RESERVOIRS

(71) Applicant: ARAMCO SERVICES COMPANY, Houston, TX (US)

(72) Inventors: Sivaprakash Shanmugam, Houston, TX (US); Amy J. Cairns, Houston, TX (US); Mohammed Sayed, Katy, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/452,913

(22) Filed: Oct. 29, 2021

(65) Prior Publication Data
US 2023/0137416 A1    May 4, 2023

(51) Int. Cl.
| | |
|---|---|
| *C09K 8/74* | (2006.01) |
| *C09K 8/54* | (2006.01) |
| *C08F 293/00* | (2006.01) |
| *E21B 43/27* | (2006.01) |
| *C09K 8/60* | (2006.01) |

(52) U.S. Cl.
CPC ............ *C09K 8/54* (2013.01); *C08F 293/005* (2013.01); *C09K 8/604* (2013.01); *C09K 8/74* (2013.01); *E21B 43/27* (2020.05); *C08F 2438/03* (2013.01); *C09K 2208/32* (2013.01)

(58) Field of Classification Search
CPC . C09K 8/54; C09K 8/604; C09K 8/74; C09K 2208/32; C08F 293/005; C08F 2438/03; E21B 43/27
See application file for complete search history.

(56) References Cited

U.S. PATENT DOCUMENTS

| | | | |
|---|---|---|---|
| 5,082,056 A | 1/1992 | Tackett, Jr. | |
| 6,488,091 B1 | 12/2002 | Weaver et al. | |
| 7,299,874 B2 | 11/2007 | Welton et al. | |
| 7,789,160 B2 | 9/2010 | Hough et al. | |
| 2005/0197257 A1 | 9/2005 | Bouwmeester | |
| 2010/0120637 A1* | 5/2010 | Bendejacq | C09K 8/68 525/451 |
| 2015/0080271 A1 | 3/2015 | De Wolf et al. | |
| 2015/0329767 A1 | 11/2015 | Vaughn et al. | |
| 2015/0344771 A1 | 12/2015 | Jiang et al. | |
| 2016/0003018 A1* | 1/2016 | Saboowala | C09K 8/42 166/305.1 |
| 2016/0017204 A1 | 1/2016 | Hill et al. | |
| 2016/0024890 A1 | 1/2016 | Fursdon-Welsh et al. | |

FOREIGN PATENT DOCUMENTS

| | | | |
|---|---|---|---|
| CN | 105705608 A  *  | 6/2016 | ............ C09K 8/68 |
| EP | 0 278 540 A2 | 8/1988 | |
| GB | 2 163 790 B | 2/1988 | |

OTHER PUBLICATIONS

Chatterji, J. et al., "Applications of Water-Soluble Polymers in the Oil Field"; Journal of Petroleum Technology; vol. 33, Issue 11; Paper No. SPE-9288-PA; pp. 20452-22056; Nov. 1981 (15 pages).
Norman, Lewis R. et al., "Temperature-Stable Acid-Gelling Polymers: Laboratory Evaluation and Field Results" Journal of Petroleum Technology; vol. 36, Issue 11; Paper No. SPE-10260-PA; pp. 2011-2018; Nov. 1984 (8 pages).
Chaduc, Isabelle et al., "Effect of the pH on the RAFT Polymerization of Acrylic Acid in Water. Application to the Synthesis of Poly(acrylic acid)-Stabilized Polystyrene Particles by RAFT Emulsion Polymerization"; Macromolecules; vol. 46, Issue 15; pp. 6013-6023; Jul. 25, 2013 (11 pages).
Ferguson, Christopher J. et al., "Ab Initio Emulsion Polymerization by RAFT-Controlled Self-Assembly" Macromolecules; vol. 38, Issue 6; pp. 2191-2204; Feb. 10, 2005 (14 pages).
Schenk, Anna S. et al., "Systematic Study of the Effects of Polyamines on Calcium Carbonate Precipitation"; Chemistry of Materials; vol. 26, Issue 8; pp. 2703-2711; Mar. 20, 2014 (9 pages).
He, Yuan et al., "Brine-Soluble Zwitterionic Copolymers with Tunable Adsorption on Rocks"; ACS Applied Materials & Interfaces; vol. 12, Issue 11; pp. 13568-13574; Mar. 9, 2020 (7 pages).
Thomas, Michele Moisio et al., "Adsorption of organic compounds on carbonate minerals: 3. Influence on dissolution rates"; Chemical Geology; vol. 109, Issues 1-4; pp. 227-237; Oct. 25, 1993 (11 pages).

(Continued)

*Primary Examiner* — Kumar R Bhushan
(74) *Attorney, Agent, or Firm* — Osha Bergman Watanabe & Burton LLP

(57) ABSTRACT

A composition for treating a formation includes a surfactant including an amphiphilic block copolymer having a first block and a second block and an acid. The amphiphilic block copolymer is a reaction product of a first monomer and a second monomer via a reversible addition-fragmentation chain transfer polymerization (RAFT) in a two-step reaction using a chain transfer agent (CTA) and a radical initiator. The surfactant favors adsorption onto a surface of the formation such that a temporary barrier is formed, thereby attenuating a reaction rate between the acid and the formation.

9 Claims, No Drawings

(56) References Cited

OTHER PUBLICATIONS

Reyes, Enrique et al., "Retarding HCl Acid Reactivity Without Gelling Agents, Emulsifiers, or Polymers for Low to High Temperature Acidizing Applications"; Proceedings of the SPE International Conference and Exhibition on Formation Damage Control; Paper No. SPE-199284-MS; pp. 1-11; Feb. 19-21, 2020 (11 pages).

Colombani, Olivier et al., "Synthesis of Poly(n-butyl acrylate)-block-poly(acrylic acid) Diblock Copolymers by ATRP and Their Micellization in Water"; Macromolecules; vol. 40, Issue 12; pp. 4338-4350; May 16, 2007 (13 pages).

Gaillard, Nicolas et al., "Block Copolymers of Acrylic Acid and Butyl Acrylate Prepared by Reversible Addition-Fragmentation Chain Transfer Polymerization: Synthesis, Characterization, and Use in Emulsion Polymerization" Journal of Polymer Science—Part A: Polymer Chemistry; vol. 41, Issue 5; pp. 684-698; Jan. 17, 2003 (15 pages).

Chenal, Marion et al., "Ab initio RAFT emulsion polymerization of butyl acrylate mediated by poly(acrylic acid) trithiocarbonate"; Polymer Chemistry; vol. 4, Issue 3; pp. 752-762; Oct. 8, 2012 (11 pages).

\* cited by examiner

AMPHIPHILIC BLOCK COPOLYMER SURFACTANT FOR ATTENUATING ACID REACTIVITY DURING ACID STIMULATION OF CARBONATE RICH RESERVOIRS

BACKGROUND

In order to increase hydrocarbon production in carbonate formations, treatments are often performed with acids, such as inorganic acids, organic acids, or a combination of both. These acids may be selected based on their reactivity with the carbonate formations of rock matrix. Matrix stimulation treatments may be performed by injecting these acids through wellbores to react with and dissolve parts of the carbonate formations. In successful treatments, the dissolution process results in the formation of highly conductive channel networks, thereby enhancing hydrocarbon production. Such acid stimulation may be carried out in carbonate formations (e.g., calcite, dolomite, and the like) using strong mineral acids. For example, hydrochloric acid (HCl) may be chosen for its low cost and effectiveness in dissolving calcium and magnesium carbonates. Moreover, the reaction products resulting from the dissolution are readily soluble in water, which may be advantageous in preventing damage of the formation.

However, HCl may react intensely with calcite-rich rock matrices, particularly at elevated temperatures, resulting in significant operational limitations in terms of performance or cost. For example, when HCl is used in high concentrations, it may react rapidly with the rock matrix before deep penetration into the rock matrix can be achieved. This will pose the need for larger volumes of acid to be used to efficiently stimulate the zone. Other limitations may include various safety concerns associated with the transfer and handling of highly corrosive acids at the well site. As well, undesired acid reactions occurring near the wellbore may cause corrosion and damage to drilling equipment, metal tubulars, and casing, resulting in safety issues for operators. Additionally, corrosion inhibitors may be needed for the acid treatment, increasing the cost and complexity of operations. Corrosion inhibitors may also lead to formation damage which, if not addressed, may reduce permeability in the reservoir thereby limiting hydrocarbon production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein are directed to a composition for treating a formation, including a surfactant and an acid. The surfactant includes an amphiphilic block copolymer having a first block and a second block. The amphiphilic block copolymer is a reaction product of a first monomer and a second monomer via a reversible addition-fragmentation chain transfer polymerization (RAFT) in a two-step reaction using a chain transfer agent (CTA) and a radical initiator. The surfactant favors adsorption onto a surface of the formation such that a temporary barrier is formed, thereby attenuating a reaction rate between the acid and the formation.

In another aspect, embodiments disclosed herein are directed to a method for controlling the reactivity of a formation treatment composition with a formation. The method includes introducing a formation treatment composition into a wellbore such that that the formation treatment composition contacts a surface of the formation; providing an adsorption of the surfactant onto a surface of the formation; and attenuating a reaction rate between the acid and the formation. The formation treatment composition comprises a surfactant including an amphiphilic block copolymer and an acid. The amphiphilic block copolymer is synthesized by reversible addition-fragmentation chain transfer polymerization (RAFT) in a two-step reaction using a first monomer, a second monomer, a chain transfer agent (CTA), and a radical initiator.

Other aspects and advantages of the claimed subject matter will be apparent from the following description and the appended claims.

DETAILED DESCRIPTION

Several strategies have been employed for retarding the reaction rate between an acid and a rock matrix. For example, the acid may be encapsulated or emulsified to form a temporary barrier between the acid and the rock matrix. The temporary barrier may be formed by a polymer-type shell or coating, an acid-in-diesel (a water-in-oil) emulsion, foaming of the acid, or gelled systems. When the acid is encapsulated or emulsified, stimuli changes, such as temperature, pressure, pH, or shear, may be used to trigger the release of the acid. Alternative strategies have included the use of organic acids, chelants, or retarding agents. However, limitations still exist, such as the high friction pressures resulting from pumping of emulsified acid systems and increased operational complexity in fluid preparation. The solubility of the resultant products of organic acids with the matrix material may also be limited. The reaction rate between the acid and the rock matrix may also be attenuated by an acid retarding agent containing a salt which has the potential to slow down proton diffusion from the bulk acid to the rock surface.

There exists a need for improved matrix acid stimulation and acid fracturing of carbonate rich reservoirs to achieve a deeper penetration of acid or to minimize the amount of acid used.

One or more embodiments of the present disclosure relate to a formation treatment composition for retarding the reaction rate between an acid (e.g. HCl) and carbonate formations of the rock matrix. The formation treatment composition may include a surfactant including an amphiphilic block copolymer having two blocks, and an acid. The amphiphilic block copolymer may have a first block bearing the head moiety that adsorbs onto the formation surface and a second block bearing the tail moiety that repels the acid-containing aqueous phase from the formation surface, providing a temporary barrier between the acid and the rock matrix. The first block is hydrophilic with preferential affinity toward the formation surface and may be anionic, cationic, or polar uncharged. The second block may be a hydrophobic block.

In one or more embodiments, a formation treatment composition may include a surfactant that is an amphiphilic block copolymer at a concentration of up to 70 gpt (i.e., gallons of chemical per 1000 gallons of clean fluid). The amphiphilic block copolymer may have a number average molecular weight ($M_n$) between about 1,000 g/mol and about 10,000 g/mol. The molecular weight of the amphiphilic block copolymer may be between about 2,000 g/mol and 10,000 g/mol, or between 5,000 g/mol and 10,000 g/mol, or between 8,000 g/mol and 10,000 g/mol.

In one or more embodiments, an amphiphilic block copolymer may be a compound represented by Formula I, including a first block (i.e. Block 1) and a second block (i.e. Block 2). In some embodiments, the amphiphilic block copolymer may have more than two blocks.

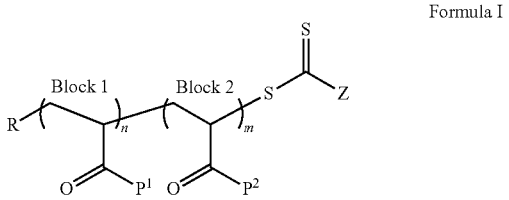

Formula I

According to one or more embodiments, each of the Block 1 and Block 2 is polymerized from vinyl monomers represented by Formula II.

Formula II

In some embodiments, $R_1$ and $R_2$ may include a halogen, H, CN, $CF_3$, straight or branched alkyl of $C_1$-$C_{20}$, α, β-unsaturated straight or branched alkenyl or alkynyl of $C_2$-$C_{10}$, α, β-unsaturated straight or branched alkenyl of $C_2$-$C_6$ substituted with a halogen, $C_3$-$C_8$ cycloalkyl, heterocyclyl C(=Y)$R_5$, C(=Y)$NR_6R_7$, or YC(=Y)$R_8$ (where Y may be $NR_8$ or O and $R_5$ is alkyl of $C_1$-$C_{20}$, alkoxy of $C_1$-$C_{20}$, aryloxy or heterocyclyloxy; $R_6$ and $R_7$ are independently H or alkyl of $C_1$-$C_{20}$, or $R_6$ and $R_7$ may be joined together to form an alkylene group of $C_2$-$C_5$, thus forming a 3- to 6-membered ring; and $R_8$ is H, straight or branched $C_1$-$C_{20}$ alkyl or aryl). In some embodiments, $R_3$ and $R_4$ are independently selected from the group of a halogen, H, $C_1$-$C_6$ alkyl and $COOR_9$, where $R_9$ is an alkali metal, H, or a $C_1$-$C_6$ alkyl group. In some embodiments, $R_1$ and $R_2$ may be joined to form a cycloalkyl or heterocyclyl group. In some embodiments, $R_1$ and $R_3$ may be joined to form a group of the formula $(CH_2)_n$, the $(CH_2)_n$ may be substituted with from 1 to 2n halogen atoms or $C_1$-$C_4$ alkyl groups. In some embodiments, at least two of $R_1$, $R_2$, $R_3$, and $R_4$ are a halogen or H.

In some embodiments, Block 1 contains a first monomer with n repeating units as shown in Formula 1, where n ranges from 5 to 150. The first monomer may include one or more of acrylic acid, 2-acrylamido-2-methylpropanesulfonic acid, 2-hydroxyethyl acrylate, acrylamide, N,N'-dimethylacrylamide, and 2-(dimethylamino)ethyl methacrylate.

Block 1 may include anionic or cationic monomers. In some embodiments, Block 1 may include one or more methacrylate or methacrylamide monomers with carboxylic acid or carboxyl groups, for example, acrylic acid, methacrylic acid, ethacrylic acid, α-chloroacrylic acid, crotonic acid, maleic acid, itaconic acid, citraconic acid, mesaconic acid, glutaconic acid, aconitic acid, fumaric acid, and monoethylenically unsaturated $C_4$-$C_{10}$ (preferably $C_4$ to $C_6$) dicarboxylic acid monoesters (e.g., monomethyl maleate). In some embodiments, Block 1 may include one or more methacrylate or methacrylamide monomers with phosphate, phosphonate, or phosphonite groups in free acid form or in saline form, for example, 2-acrylamido-ethylphosphonic acid (AEPA), monoacryloyloxyethyl phosphate, bis(2-methacryloyloxyethyl) phosphate, vinylphosphonic acid, allylphosphonic acid, isopropylphosphonic acid, diallyl aminomethylene phosphonate, and salts of above acids. In some embodiments, Block 1 may include one or more of a monomer with sulfonic acid or sulfonate groups, for example, 3-sulfopropyl methacrylate, 2-propene-1-sulfonic acid, sodium 1-allyloxy-2 hydroxypropyl sulfonate (COPS1), 2-acrylamido-2-methylpropanesulfonic acid (AMPS), methallyl sulfonate, sodium vinylsulfonate, and sodium styrenesulfonate. In some embodiments, Block 1 may include one or more methacrylate or methacrylamide monomers with ammonium groups, for example, N,N'-dimethylaminomethyl meth acrylate, N,N'-dimethylaminoethyl methacrylate, N,N'-diethylaminoethyl methacrylate, N,N'-dimethylaminopropyl methacrylate, N,N'-diethylaminopropyl methacrylate, N,N'-dimethylaminocyclohexyl methacrylate, N-[2-(dimethylamino) ethyl] methacrylamide, N-[3-(dimethylamino) propyl] methacrylamide, N-[4-(dimethylamino) butyl]methacrylamide, N-[2-(diethylamino) ethyl] methacrylamide, and N-[4-(dimethylamino) cyclohexyl] methacrylamide, and [2-(methacryloyloxy) ethyl] trimethylammonium chloride.

In some embodiments, Block 1 may include one or more zwitterionic monomers, for example, N-(3-sulfopropyl)-N-methacroyloxyethyl-N,N'-dimethylammonium betaine, N-(3-sulfopropyl)-N-methacroylamidepropyl-N,N'-dimethylammonium betaine, N-(3-carboxymethyl)-N-methacroylamidepropyl-N,N'-dimethylammonium betaine, and N-carboxymethyl-N-methacroyloxyethyl-N,N'-dimethylammonium betaine.

Block 1 may include polar uncharged monomers. In some embodiments, Block 1 may include one or more methacrylate or methacrylamide monomers with $C_2$-$C_{30}$ alkane diols or polyethylene glycol, for example, 2-hydroxyethyl methacrylate, 2-hydroxypropyl methacrylate, 3-hydroxypropyl methacrylate, 3-hydroxybutyl methacrylate, 4-hydroxybutyl methacrylate, 6-hydroxy hexyl methacrylate, 3-hydroxy-2-ethylhexyl methacrylate, 2-hydroxy-3-phenoxypropyl methacrylate, N-(hydroxymethyl) acrylamide, N-(2-hydroxypropyl) methacrylamide, N-hydroxyethylacrylamide, N-[tris (hydroxymethyl) methacrylamide, glycerol acrylate, glycerol monomethacrylate, 4-vinylphenylboronic acid, and vinyl boronic acid pinacol ester. In some embodiments, Block 1 may include one or more acrylamide monomers, for example, N,N'-(dimethyl acrylamide) (DMA), morpholine N-oxide acrylamide, diacetone acrylamide, N,N'-dimethyl methacrylamide, N,N'-diethylacrylamide, N-isopropyl methacrylamide, N-tert-butyl methacrylamide, and diacetone acrylamide. In some embodiments, Block 1 may include one or more other hydrophilic monomers, for example, 4-acryloylmorpholine, 2-N-morpholinoethyl methacrylate, methacrylate of polyethylene glycol, methacrylate of diethylene glycol, ethylene glycol methyl ether methacrylate, poly (propylene glycol) acrylate, 2-chloroethyl methacrylate, tetrahydrofurfuryl acrylate, vinyl acetamide, vinyl pyrrolidone, N-vinyl piperidone, N-vinyl caprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, and N-vinyl-7-ethyl-2-caprolactam.

Block 2 contains a second monomer with m repeating units as shown in Formula I, where m ranges from 5 to 150. The second monomer may include one or more of methyl acrylate, tert-butyl acrylate, butyl acrylate, 2-ethylhexyl acrylate, dodecyl acrylate, stearyl acrylate, and styrene. In some embodiments, Block 2 may include one or more hydrophobic alkyl methacrylate monomers, $C_2$-$C_{40}$ alkyl esters of acrylic acid, $C_1$-$C_{40}$ alkyl esters of methacrylic acid, vinyl aromatics, and fluorinated alkyl methacrylates. In some embodiments, Block 2 may include one or more alkyl methacrylate monomers with $C_1$-$C_{20}$ alkyl chains, $C_2$-$C_{40}$-alkyl esters of acrylic acid, $C_1$-$C_{40}$ alkyl esters of methacrylic acid. In some embodiments, Block 2 may include one or more of methyl methacrylate, ethyl methacrylate, N-propyl methacrylate, isopropyl methacrylate, N-butyl methacrylate, isobutyl methacrylate, tert-butyl methacrylate, pentyl methacrylate, N-hexyl methacrylate, N-heptyl methacrylate, N-octyl methacrylate, 2-ethylhexyl methacrylate, decyl methacrylate, lauryl methacrylate, palmityl methacrylate, stearyl methacrylate, hydrenol methacrylate, behenyl methacrylate, polyisobutene methacrylate, phenoxyethyl methacrylate, phenyl methacrylate, benzyl methacrylate, vinyl aromatic monomers (e.g., styrene), N-vinylcarbazole, 2-vinylpyridine, 4-vinylpyridine, 2-vinylpyrazine, 1-vinylimidazole, 4-acetoxystyrene, 4-bromostyrene, 2,4-dimethylstyrene, 2,5-dimethylstyrene, 3,5-dimethylstyrene, 4-ethoxystyrene, 4-tert-butystyrene, 2-chlorostyrene, 3-chlorostyrene, 4-chlorostyrene, 4-ethoxystyrene, 4-fluorostyrene, 2,6-dichlorostyrene, 4-methoxystyrene, methylstyrene, 3-methylstyrene, 4-methylstyrene, 2,4,6-trimethylstyrene, and acrylate or methacrylate monomers with fluorinated functionality.

One or more embodiments of the present disclosure relate to a method for preparing a formation treatment composition including a surfactant that is an amphiphilic block copolymer, and an acid. The amphiphilic block copolymer may have a first block and a second block, synthesized in a two-step reaction using reversible addition-fragmentation chain transfer polymerization (RAFT). In a first step, a first block macro chain transfer agent is synthesized using a first monomer, a chain transfer agent (CTA), and a first radical initiator. In a second step, the second block is synthesized through chain extension of the first block macro chain transfer agent with a second monomer and a second radical initiator.

In one or more embodiments, the amphiphilic block copolymer is synthesized in a two-step reaction using reversible deactivation radical polymerization (RDRP) technique, for example, reversible addition-fragmentation chain transfer polymerization (RAFT). The reactants for amphiphilic block copolymer synthesis may include a monomer, a chain transfer agent (CTA), and a radical initiator.

In one or more embodiments, the CTA may have a structure in Formula III.

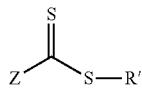

Formula III where Z may be a hydrogen atom, a chlorine atom, a sulfur atom, an optionally substituted alkyl or optionally substituted aryl radical, an optionally substituted heterocycle, an optionally substituted alkylthio radical, an optionally substituted arylthio radical, an optionally substituted alkylselenium radical, an optionally substituted arylselenium radical, an optionally substituted alkoxy radical, an optionally substituted aryloxy radical, an optionally substituted amino radical, an optionally substituted hydrazine radical, an optionally substituted alkoxycarbonyl radical, an optionally substituted aryloxycarbonyl radical, an optionally substituted acyloxy or carboxyl radical, an optionally substituted aroyloxy radical, an optionally substituted carbamoyl radical, a cyano radical, a dialkyl- or diarylphosphonato radical, a dialkyl-phosphinato or diaryl-phosphinato radical, or a polymer chain; and R' may be an optionally substituted alkyl, acyl, aryl, aralkyl, alkenyl or alkynyl group, a saturated or unsaturated, aromatic, optionally substituted carbocycle or heterocycle, or a polymer chain where the polymer chain may be hydrophilic.

In some embodiments, the Z or R' group may be optionally substituted with phenyl groups, aromatic groups, saturated or unsaturated carbocycles, saturated or unsaturated heterocycles, or groups selected from the following: alkoxycarbonyl or aryloxycarbonyl (—COOR"), carboxyl (—COOH), acyloxy (—$O_2$CR"), carbamoyl (—CONR"$_2$), cyano (—CN), alkylcarbonyl, alkylarylcarbonyl, arylcarbonyl, arylalkylcarbonyl, phthalimido, maleimido, succinimido, amidino, guanidimo, hydroxyl (—OH), amino (—NR"$_2$), halogen, perfluoroalkyl $C_nF_{2n+1}$, allyl, epoxy, alkoxy (—OR"), S-alkyl, S-aryl, Se-alkyl, Se-aryl groups exhibiting a hydrophilic or ionic nature, for example alkali metal salts of carboxylic acids, alkali metal salts of sulfonic acids, alkali metal salts of phosphonic acids, polyalkylene oxide (e.g., polyethylene oxide, polypropylene oxide, or poly(ethylene oxide)-poly(propylene oxide)) chains, cationic substituents (quaternary ammonium salts), where R" represents an alkyl, or aryl group, or a polymer chain.

In some embodiments, the CTA may include one or more of sulfur, nitrogen, oxygen, selenium, and phosphorus. In some embodiments, the CTA may include sulfur and one or more of nitrogen, oxygen, selenium, and phosphorus.

In some embodiments, the radical initiator may be used to initiate the polymerization reactions and may be selected from hydrogen peroxide, azo compound, redox system, alkali metal, ammonium persulfate, ammonium perborate, ammonium perchlorate, alkali metal persulfate, and combinations thereof. The hydrogen peroxide may be selected from tert-butyl hydroperoxide, cumene hydroperoxide, t-butyl peroxyacetate, t-butyl peroxybenzoate, t-butyl peroxyoctoate, t-butyl peroxyneodecanoate, t-butyl peroxyisobutyrate, lauroyl peroxide, t-amyl peroxypivalate, t-butyl peroxypivalate, dicumyl peroxide, benzoyl peroxide, potassium persulfate, ammonium persulfate, and combinations thereof. In some embodiments, one or more radical initiator may be used for one or more steps of synthesis. Each radical initiator used for each step of synthesis may be the same or different.

The azo compound is a compound bearing the functional group R—N═N—R', in which R and R' can be either aryl or alkyl. The azo compound may be one or more of 4,4'-azobis(4-cyanovaleic acid), 2,2'-azobis(2-methylpropionitrile), 2,2'-azobis(isobutyronitrile), 2,2'-azobis(2-butanenitrile), 4,4'-azobis(4-pentanoic acid), 1,1'-azobis(cyclohexanecarbonitrile), 2-(t-butylazo)-2-cyanopropane, 2,2'-azobis[2-methyl-N-(1,1)-bis(hydroxymethyl)-2-hydroxyethyl]-propionamide, 2,2'-azobis(2-methyl-N-hydroxyethyl]propionamide, 2,2'-azobis(N,N'-dimethyleneisobutyramidine) dichloride, 2,2'-azobis(2-amidinopropane) dichloride, 2,2'-azobis(N,N'-dimethyleneisobutyramide), 2,2'-azobis(2-methyl-N-[1,1-bis(hydroxy-methyl)-2-hydroxyethyl]propionamide), 2,2'-azobis(2-methyl-N-[1,1-bis(hydroxy-methyl)ethyl] propionamide), 2,2'-azobis[2-methyl-N-(2-hydroxyethyl) propionamide], and 2,2'-azobis(isobutyramide) dehydrate.

As previously described, the radical initiator may be a redox system. The redox system may include one or more of hydrogen peroxide, alkyl peroxide, alkyl peresters, alkyl percarbonates, iron salt, titanous salt, and zinc formaldehyde sulfoxylate or sodium formaldehyde sulfoxylate. In some embodiments, the alkali metals, ammonium persulfates, ammonium perborates, or ammonium perchlorates may be used in combination with an alkali metal bisulfite, reducing sugars, or both. The alkali metal bisulfite may include sodium metabisulfite. In some embodiments, the alkali metal persulfates may be used in combination with an arylphosphinic acid, reducing sugars, or both. The arylphosphinic acid may include benzenephosphonic acid.

One or more embodiments of the present disclosure relate to a method for controlling the reactivity of acid with a formation treatment composition which includes a surfactant having an amphiphilic block copolymer. The method includes preparing the formation treatment composition by mixing the surfactant with an acid and introducing the formation treatment composition into a wellbore such that that the formation treatment composition contacts the formation. Upon contact with the formation, the surfactant preferentially adsorbs onto the formation surface, creating a temporary barrier between the acid and the formation surface, retarding the acid reactivity.

In some embodiments, the surfactant and the acid may each be in an aqueous solution. In some embodiments, the surfactant and an acid may be added, separately or together, to an aqueous medium in the formation treatment composition so that the surfactant is in an amount sub-stoichiometric compared to the acid. In some embodiments, the surfactant may be added with an acidic aqueous solution in the formation treatment composition so that the surfactant is present in the formation treatment composition at a concentration of up to 70 gpt of formation treatment composition, such as in a range of from about 0.1 gpt to about 70 gpt, from about 1 gpt to about 60 gpt, from about 2 gpt to about 50 gpt, from about 5 gpt to about 40 gpt, from about 10 gpt to about 30 gpt, and from about 10 gpt to about 20 gpt. In some embodiments, the formation treatment composition may be added to formations having fractures extending from tens to several hundreds of feet.

When introduced into a wellbore, the surfactant may include a hydrophilic head-group and a hydrophobic tail-group. The surfactant may adhere to the formation surface via surface adsorption resulting from the coordination of the hydrophilic head groups with the formation surface. The tail groups are therefore directed outward from the formation surface. The tail groups induce a hydrophobic character in the vicinity of the formation surface. This hydrophobic character hinders access of water and aqueous solution containing acid to the formation surface. As such, the surfactant may alter the wettability of the formation surface to oil wet upon adsorption, providing a temporary barrier between the acid and the rock matrix. The water or aqueous solution containing acid therefore passes deeper into the formation, where it may encounter a portion of formation surface not hindered by the surfactant and then interact with such surface, including reacting with it at a deeper penetration depth.

According to one or more embodiments of the present disclosure, the block copolymer has a larger molecular weight than commercial surfactants (e.g., sodium dodecyl sulfate or sodium dodecylbenzene sulfonate), providing a higher surface area and tighter binding to the formation surface due to the presence of a high concentration of anchoring head groups. The hydrophilic head group may be anionic, cationic, or polar uncharged. Anionic groups may have preferential affinity toward cations (e.g., $Ca^{2+}$) and may adsorb onto the formation surface. Although cationic blocks are much less effective in binding to calcium carbonate rocks, polyamines with primary amine groups exert a significant effect and that the activity is strongly dependent on the length of the side chain. In contrast, polyamines comprising quaternary amines have negligible effect, despite carrying a permanent positive charge. The activity of the most active polyamines therefore depends on their ability to complex with carbonate ions present in solution, and electrostatic attraction alone is not sufficient. The hydrophobic component of the block copolymer mimics the film forming ability of polymer whereby the chain length and linear or bulkiness of the substituents can be readily tailored to enhance performance. Unlike long chain polymers (e.g., poly(styrene-butadiene-styrene) rubber), the short chains of the block copolymer ensure ease of clean up to prevent occlusion of pores on the rock surface.

In some embodiments, the surfactant may be functionalized to promote stronger interaction with the rock matrix, for example, by introducing a greater number of hydrophilic moieties on the surfactant molecule or by introducing functional moieties that will impart covalent and non-covalent interactions with neighboring surfactant molecules adsorbed on the formation surface (for example, pi-pi stacking and hydrogen bonding). The resulting more compact stacking of neighboring surfactant molecules on the formation surface may provide a more effective barrier to water and aqueous solutions containing acid, enhancing the attenuation effect. In some embodiments, the surfactant may generate foam, which may be responsible for the attenuation behavior as the presence of foam in the vicinity of the formation surface will provide a temporary barrier between the acid and the rock matrix.

In some embodiments, the surfactant may be combined with suitable inorganic or organic acids or acid-producing systems as a means of tailoring the acid reactivity with the rock matrix. In some embodiments, the formation treatment composition of the present disclosure may incorporate an acid in an aqueous solution. The acid may include an inorganic acid, an organic acid, or both. The inorganic acid may include, but is not limited to, hydrochloric acid, sulfuric acid, nitric acid, phosphoric acid, hydrofluoric acid, hydrobromic acid, perchloric acid, fluoroboric acid, or derivatives, and mixtures thereof. The organic acid may include, but is not limited to, methanesulfonic acid, formic acid, acetic acid, citric acid, lactic acid, sulfamic acid, chloroacetic acid, or derivatives, and mixtures thereof. Acid-producing systems may include, but are not limited to, esters, nitriles, lactones, anhydrides, orthoesters, polyesters or polyorthoesters. The acid-producing systems may include esters of short chain carboxylic acids, including, but not limited to, acetic and formic acid, and esters of hydroxycarboxylic acids, including, but not limited to, glycolic and lactic acid. These acid-producing systems may provide the corresponding acids when hydrolyzed in the presence of water. The acid may be present in an aqueous solution at a concentration in a range of from about 5 wt % to about 35 wt %, such as from about 7 wt % to about 32 wt %, from about 10 wt % to about 30 wt %, and from about 15 wt % to about 28 wt %, based on the weight of the aqueous solution.

The formation treatment composition described in one or more embodiments of the present disclosure may optionally include one or more additives, for example, to improve the compatibility of the fluids described in this application with other fluids (for instance, formation fluids) that may be present in the well bore. Suitable additives may be used in liquid or powder form. Where used, additives are present in the fluids in an amount sufficient to prevent incompatibility with formation fluids or well bore fluids. In some embodiments, additives may be in a range of from about 0.01 vol % to about 10 vol % (volume percentage) of the formation treatment composition. In some embodiments, where powdered additives are used, the additives may be present in an amount in the range of from about 0.001 wt % to about 10 wt % of the total formation treatment composition. Examples of surfactants may include LOSURF-259™ non-ionic non-emulsifier, LOSURF-300™ nonionic surfactant, LOSURF-357™ nonionic surfactant, LOSURF-400™ surfactant, and NEA-96M™ Surfactant.

In some embodiments, mutual solvents may be employed. Mutual solvents may help keep other additives in solution. Suitable mutual solvents may include, but are not limited to, Halliburton's MUSOL® Mutual Solvent, MUSOL® A Mutual Solvent, MUSOL® E Mutual Solvent, ethylene glycol monobutyl ether, propylene glycol monobutyl ether, water, methanol, isopropyl alcohol, alcohol ethers, aromatic solvents, other hydrocarbons, mineral oils, paraffins, derivatives thereof, and combinations thereof. Other suitable solvents may also be used. If used, the mutual solvent may be included in a range of from about 1 vol % to about 20 vol %, and in certain embodiments in a range of from about 5 vol % to about 10 vol % based on the of the total volume of the formation treatment composition.

In some embodiments, the formation treatment composition may optionally include one or more viscosifying agents. In some embodiments, the formation treatment composition may be viscosified by a polymer system, for instance, a cross-linked polymer system, where the crosslinker comprises zirconium or ferric metal clusters.

In some embodiments, the formation treatment composition may optionally include one or more gelling agents. Any gelling agent suitable for use in subterranean applications may be used in the formation treatment composition of the present disclosure, including, but not limited to, natural biopolymers, synthetic polymers, cross-linked gelling agents, and viscoelastic surfactants. Guar and xanthan are examples of suitable gelling agents. A variety of gelling agents may be used, including hydratable polymers that contain one or more functional groups such as hydroxyl, carboxyl, sulfate, sulfonate, amino or amide groups. Suitable gelling agents may comprise polysaccharides, biopolymers, synthetic polymers, and a combination thereof. Examples of suitable polymers include, but are not limited to, guar gum and derivatives thereof, such as hydroxypropyl guar and carboxymethylhydroxypropyl guar; cellulose derivatives, such as hydroxyethyl cellulose; locust bean gum; tara; konjak; tamarind; starch; cellulose; karaya; diutan; scleroglucan; wellan; gellan; xanthan; tragacanth; carrageenan; derivatives thereof; and combinations thereof of one or more of such polymers. Additionally, synthetic polymers and copolymers may be used. Examples of such synthetic polymers include, but are not limited to, polyacrylate, polymethacrylate, polyacrylamide, polyvinyl alcohol, and polyvinylpyrrolidone. Commonly used synthetic polymer acid-gelling agents may include polymers and copolymers having various ratios of acrylic, acrylamide, acrylamidomethylpropane sulfonic acid, quaternized dimethylaminoethylacrylate, and quaternized dimethylaminoethylmethacrylate.

In other embodiments, the gelling agent molecule may be depolymerized. The term "depolymerized" generally refers to a decrease in the molecular weight of the gelling agent molecule. The gelling agent may include oxidizers, encapsulated oxidizers, or enzyme breakers, such as sodium persulfate, potassium persulfate, ammonium persulfate, magnesium peroxide, sodium chlorite, sodium bromate, alpha and beta amylases, amyloglucosidase, invertase, maltase, cellulose, hemicellulose, and the like. If used, a gelling agent may be present in the acid-generating fluids of the formation treatment composition in an amount in the range of from about 0.01 wt % to about 5 wt % of the base fluid.

To combat possible perceived problems associated with polymeric gelling agents, some surfactants have been used as gelling agents. It is well understood that when mixed with a fluid in a concentration greater than the critical micelle concentration the molecules (or ions) of surfactants may associate to form micelles. These micelles may function, among other purposes, to stabilize emulsions, break emulsions, stabilize foam, change the wettability of a surface, solubilize certain materials, and reduce surface tension. When used as a gelling agent, the molecules (or ions) of the surfactants used associate to form micelles of a certain micellar structure (e.g., rodlike, wormlike, or vesicles which are referred to here as "viscosifying micelles") that, under certain conditions (e.g., concentration or ionic strength of the fluid) are capable of, inter alia, imparting increased viscosity to a particular fluid and forming a gel. Certain viscosifying micelles may impart increased viscosity to a fluid such that the fluid exhibits viscoelastic behavior (e.g., shear thinning properties) due, at least in part, to the association of the surfactant molecules. Moreover, because the viscosifying micelles may be sensitive to pH and hydrocarbons, the viscosity of these viscoelastic surfactant fluids may be reduced after introduction into the subterranean formation without the need for certain types of gel breakers (e.g., oxidizers). A particular surfactant that may be useful is a methyl ester sulfonate (MES) surfactant. Suitable MES surfactants include, but are not limited to, methyl ester sulfonate surfactants having the formula $RCH(SO_3M)CO_2CH_3$, where R is an alkyl chain of about $C_{10}$-$C_{30}$. This may allow a substantial portion of the viscoelastic surfactant fluids to be produced back from the formation without the need for expensive remedial treatments. If used, these surfactants may be used in an amount of up to about 10 wt % of the formation treatment composition.

While optional, at least a portion of the gelling agent included in the formation treatment composition may be cross linked by a reaction comprising a cross linking agent, for example, to further increase viscosity. Cross-linking agents typically comprise at least one metal ion that is capable of cross-linking gelling agent molecules. Various cross-linking agents may be suitable; formation treatment compositions are not limited by ligand choice on the cross-linking agent. Examples of suitable cross linking agents may include zirconium compounds (such as, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, titanium lactate, titanium maleate, titanium citrate, titanium ammonium lactate, titanium triethanolamine, and titanium acetylacetonate); aluminum compounds (such as, aluminum lactate or aluminum citrate); borate compounds (such as, sodium tetraborate, boric acid, disodium octaborate tetrahydrate, sodium diborate, ulexite, and colemanite); antimony compounds; chromium compounds; iron compounds; copper compounds; zinc compounds; or a combination thereof. An example of a suitable commercially available zirconium-based cross-linking agent is CL-24™ cross-linker from Halliburton Energy Services, Inc., Duncan, Okla. An example of a suitable commercially available titanium-based cross-linking agent is CL-39™ cross linker from Halliburton Energy Services, Inc., Duncan Okla. An example of a suitable borate-based cross-linking agent is commercially available as CL-22™ delayed borate cross linker from Halliburton Energy Services, Inc., Duncan, Okla. Divalent ions also may be used, for example, calcium chloride and magnesium oxide. An example of a suitable divalent ion cross linking agent is commercially available as CL-30™ from Halliburton Energy Services, Inc., Duncan, Okla. Another example of a suitable cross-linking agent is CL-15, from Halliburton Energy Services, Inc., Duncan Okla. Where present, the cross-linking agent generally may be included in the treatment composition in an amount sufficient, among other things, to provide the desired degree of cross linking. In some embodiments, the cross-linking agent may be present in the formation treatment composition in an amount in the range of from about 0.01 wt % to about 5 wt % of the total weight of the formation treatment composition. Buffering compounds may be used if desired, for example, to delay or control the cross-linking reaction. These may include, but are not limited to, glycolic acid, carbonates, bicarbonates, acetates, and phosphates. In some embodiments, if a gelling agent (for instance, a cross linked gelling agent) is used, then a suitable breaker may be advisable depending on the gelling agent and its interaction with the acid-generating compound, the generated acid, and the well bore conditions. A breaker may be advisable to ultimately reduce the viscosity of the formation treatment composition. Any breaker suitable for the subterranean formation and the gelling agent may be used. The amount of a breaker to include will depend, inter alia, on the amount of gelling agent present in the formation treatment composition. Other considerations regarding the breaker are known to one skilled in the art.

In one or more embodiments, the formation treatment composition may optionally include one or more bactericides. Bactericides protect both the subterranean formation as well as the fluid from attack by bacteria. Such attacks may be problematic because they may reduce the viscosity of the fluid, resulting in poorer performance, for example. Bacteria may also cause plugging by bacterial slime production and can turn the oil in the formation sour. Any bactericides known in the art are suitable. An artisan of ordinary skill with the benefit of this disclosure will be able to identify a suitable bactericide and the proper concentration of such bactericide for a given application. Where used, such bactericides may be present in an amount sufficient to destroy all bacteria that may be present. Examples of suitable bactericides include, but are not limited to 2,2-dibromo-3-nitrilopropionamide and 2-bromo-2-nitro-1,3-propanediol. In one embodiment, the bactericides may be present in the formation treatment composition in an amount in the range of from about 0.001 wt % to about 0.003 wt % based on the total weight of the formation treatment composition. Another example of a suitable bactericide is a solution of sodium hypochlorite. In certain embodiments, such bactericides may be present in the formation treatment composition in an amount in the range of from about 0.01 vol % to about 0.1 vol % based on the total volume of the formation treatment composition.

In one or more embodiments, the formation treatment compositions may optionally include additional additives. Examples of such additional additives may include, but are not limited to, oxidizing agents, lost circulation materials, scale inhibitors, surfactants, clay stabilizers, corrosion inhibitors, paraffin inhibitors, asphaltene inhibitors, penetrating agents, clay control additives, iron control additives, reducers, oxygen scavengers, sulfide scavengers, emulsifiers, foamers, gases, derivatives thereof, and combinations thereof.

In some embodiments, the formation treatment composition may optionally include additional additives, such as a foamer. Examples of foamers include, but are not limited to, surfactants, for example, water-soluble, nonionic, anionic, cationic, and amphoteric surfactants; carbohydrates, for example, polysaccharides, cellulosic derivatives, guar, guar derivatives, xanthan, carrageenan, starch polymers, gums, polyacrylamides, polyacrylates, betaine-based surfactants, viscoelastic surfactants, natural and synthetic clays; polymeric surfactants, for example, partially hydrolyzed polyvinyl acetate; partially hydrolyzed modified polyvinyl acetate; block or copolymers of polyethane, polypropane, polybutane and polypentane; proteins; partially hydrolyzed polyvinyl acetate, polyacrylate, and derivatives of polyacrylates; polyvinyl pyrrolidone and derivatives thereof; $N_2$; CO; $CO_2$; air; and natural gas; and combinations thereof.

One or more embodiments of the present disclosure relate to a method of retarding the acid reactivity of a formation treatment composition. The method includes preparing the formation treatment composition by mixing a surfactant including an amphiphilic block copolymer with an acid and introducing the formation treatment composition into a wellbore such that that surfactant contacts the formation and forms a temporary barrier between the acid and the formation surface. The method may attenuate or retard the reaction rate between the acid and the rock matrix through the addition of a surfactant including the amphiphilic block copolymer. The surfactant may be added to an acidic media at low concentrations, for example, up to about 70 gpt, such as in a range of from about 0.1 gpt to about 70 gpt, from about 1 gpt to about 60 gpt, from about 2 gpt to about 50 gpt, from about 5 gpt to about 40 gpt, from about 10 gpt to about 30 gpt, and from about 10 gpt to about 20 gpt.

In some embodiments, the step of contacting comprises introducing the aqueous solution into the formation via coiled tubing or bullheading in a production tube.

In some embodiments, the method may include introducing an aqueous solution of the acid and an aqueous solution of the surfactant into the formation via the same tubing (e.g., the same coiled tubing). A mixture comprising the aqueous solution of the acid and the aqueous solution of the surfactant forms the formation treatment composition.

In some embodiments, in these methods, the method may include introducing an aqueous solution of the acid and an aqueous solution of the surfactant into the formation in separate stages, optionally via the same or different tubings, such as the same or different coiled tubings, and allowing the aqueous fluids to mix within the formation to form the formation treatment composition. The two aqueous solutions are mixed in situ within the tubing, within the formation, or within the area around the wellbore. In some embodiments, the aqueous solution of the surfactant may be introduced into the formation first. In some embodiments, the acidic solution/stimulation fluid may be introduced into the formation first.

In some embodiments, in these methods, the formation treatment composition is in contact with the formation for a time ranging from about 1 hour to about 12 hours, or from about 2 hours to about 11 hours, or from about 3 hours to about 10 hours, or from about 4 hours to about 9 hours, or from about 5 hours to about 8 hours, or from about 4 hours to about 8 hours.

In some embodiments, the methods may further include producing hydrocarbons from the carbonate formation, which contains highly conductive channel networks formed by the retarded action of the acid solution within the formation.

EXAMPLES

The following examples are merely illustrative and should not be interpreted as limiting the scope of the present disclosure.

Example 1 Synthesis of a Specific Example of an Amphiphilic Block Copolymer

An example of the amphiphilic block copolymer is poly(acrylic acid)-block-(poly(tert-butyl acrylate) (PAA-b-PtBA), synthesized in a two-step RAFT reaction. In the first step, poly(acrylic acid) (PAA) macro chain transfer agent (MCTA) is synthesized using acrylic acid (AA), 2-(butylthiocarbonothioylthio)propanoic acid (BTPA), and 4,4'-azobis(4-cyanopentanoic acid) (ACPA) in water-ethanol mixture. The second step involves chain extension of the PAA MCTA with tert-butyl acrylate (tBA) monomer initiated by 2,2'-azobis(2-methylpropionitrile) (AIBN) in tetrahydrofuran (THF). The two-step reaction may be represented by the reaction pathway shown in Scheme I below.

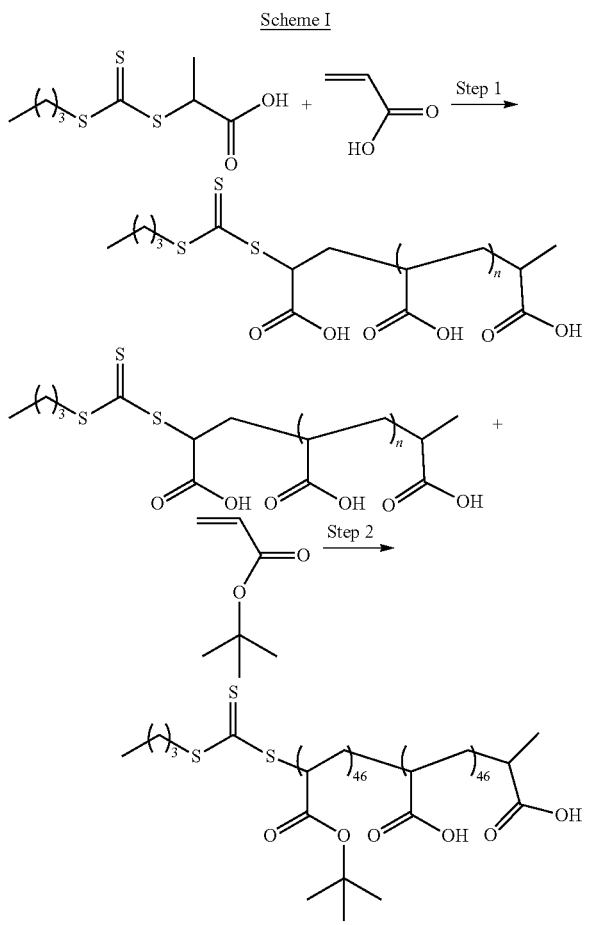

Scheme I

In the first step, 46:1:0.1 molar ratio of AA, BTPA, and ACPA reactants are mixed, purged under nitrogen for 20 min, allowed for reaction at 70° C. for 3 hours, terminated by ice bath cooling to room temperature, and dried to remove solvent. The as-synthesized PAA MCTA has a molecular weight $M_n$ of about 3554 g/mol. In the second step, 46:1:0.1 molar ratio of tBA, PAA MCTA, and AIBN are mixed, purged under nitrogen for 20 min, allowed for reaction at 60° C. for 12 hours, terminated by ice bath cooling to room temperature, and dried to remove solvent. The as-synthesized amphiphilic block copolymer is $PAA_{46}$-b-$PtBA_{46}$, having a molecular weight $M_n$ of 9450 g/mol with 46 AA repeating units and 46 tBA repeating units in each chain with respect to one chain transfer agent (i.e., BTPA). Almost all the polymer chains include a chain transfer agent.

Example 2 Core-Plug Dissolution Using $PAA_{46}$-b-$PtBA_{46}$ as Surfactant A series of core-plug dissolution experiments was performed using HCl at varying concentrations with and without the surfactant. Tables 1 provides the experimental details showing the dissolution profiles of this series of acid formulations under ambient pressure and temperature, fluid volume (250 milliliters (mL)) and exposure time (5 minutes). The acid formulations were prepared by adding up to 20 gpt of surfactant (if used) to 28 wt % HCl solutions. Homogenous Indiana limestone core samples having a permeability between 4 to 8 millidarcy (mD) were cut to have a diameter of 1.5 inches and a length of 0.5 inches. One core sample was used for each individual test, after drying in oven at 248° F. overnight. Each of the dried cores were then saturated in deionized $H_2O$ (DI-$H_2O$) under vacuum for 12 to 24 hours. The saturated cores were transferred to a beaker containing 250 mL of the acid, as shown in Table 3. For each experiment, the core sample was placed standing up in the solution to ensure consistency across the series. The weight of each of the saturated acidized core samples was measured for the saturated samples. The percent of the weight loss for each core was calculated and compared.

Table 1 provides the calculated weight loss of Indiana limestone core samples, post-acidizing, for acid formulations containing 28 wt % HCl in the presence of $PAA_{46}$-b-$PtBA_{46}$. The data provided in Table 1 show that the formulations including surfactants resulted in the attenuation of acid reactivity with the rock.

TABLE 1

| Formulation | HCl (wt %) | Surfactant | Surfactant Concentration (gpt) | Weight Loss after 5 min (%) |
|---|---|---|---|---|
| 1 | 28 | none | 0 | 100% |
| 2 | 28 | $PAA_{46}$-b-$PtBA_{46}$ | 10 | 76.3 |
| 3 | 28 | $PAA_{46}$-b-$PtBA_{46}$ | 20/1 h soak in aq phase | 59.7 |
| 4 | 28 | $PAA_{46}$-b-$PtBA_{46}$ | 20/72 h soak in aq phase | 60.4 |

While only a limited number of embodiments have been described, those skilled in the art having benefit of this disclosure will appreciate that other embodiments can be devised which do not depart from the scope of the disclosure.

Although the preceding description has been described here with reference to particular means, materials and embodiments, it is not intended to be limited to the particulars disclosed here; rather, it extends to all functionally equivalent structures, methods and uses, such as those within the scope of the appended claims.

The presently disclosed methods and compositions may suitably comprise, consist or consist essentially of the elements disclosed and may be practiced in the absence of an element not disclosed. For example, those skilled in the art can recognize that certain steps can be combined into a single step.

Unless defined otherwise, all technical and scientific terms used have the same meaning as commonly understood by one of ordinary skill in the art to which these systems, apparatuses, methods, processes and compositions belong.

The ranges of this disclosure may be expressed in the disclosure as from about one particular value, to about another particular value, or both. When such a range is expressed, it is to be understood that another embodiment is from the one particular value, to the other particular value, or both, along with all combinations within this range.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" or "optional" mean that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed:

1. A composition for treating a formation, comprising:
    a surfactant including an amphiphilic block copolymer having a first block and a second block; and
    an acid,
        wherein the amphiphilic block copolymer is a reaction product of a first monomer and a second monomer via a reversible addition-fragmentation chain transfer polymerization (RAFT) in a two-step reaction,
        wherein the two-step reaction includes a first step synthesized using the first monomer, a chain transfer agent, and a first radical initiator, and a second step synthesized through chain extension of the first block using the second monomer and a second radical initiator,
        wherein the first radical initiator is different from the second radical initiator, and
        wherein the surfactant favors adsorption onto a surface of the formation such that a temporary barrier is formed, thereby attenuating a reaction rate between the acid and the formation.

2. The composition of claim 1, wherein each of the first monomer and the second monomer comprises one or more compounds of formula:

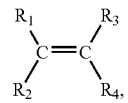

wherein
$R_1$ and $R_2$ are independently selected from the group consisting of halogen, H, CN, $CF_3$, straight or branched alkyl of $C_1$-$C_{20}$, $\alpha,\beta$-unsaturated straight or branched alkenyl or alkynyl of $C_2$-$C_{10}$, $\alpha,\beta$-unsaturated straight or branched alkenyl of $C_2$-$C_6$ substituted with a halogen, $C_3$-$C_8$ cycloalkyl, heterocyclyl $C(=Y)R_5$ (Y is $NR_8$ or O, $R_5$ is $C_1$-$C_{20}$ alkyl), $C(=Y)NR_6R_7$ ($R_6$ and $R_7$ are H or $C_1$-$C_{20}$ alkyl, or $R_6$ and $R_7$ together form a 3- to 6-membered ring), and $YC(=Y)R_8$ ($R_8$ is H, or straight or branched $C_1$-$C_{20}$ alkyl or aryl);
$R_3$ and $R_4$ are independently selected from the group consisting of halogen, H, $C_1$-$C_6$ alkyl, and $COOR_9$, where $R_9$ is an alkali metal, H, or a $C_1$-$C_6$ alkyl group;
or $R_1$ and $R_3$ together form a $(CH_2)_n$, or $(CH_2)_n$ substituted with from 1 to 2n halogen atoms or $C_1$-$C_4$ alkyl; and
at least two of $R_1$, $R_2$, $R_3$, and $R_4$ are a halogen or H.

3. The composition of claim 1, wherein the first block comprises one or more of acrylic acid, 2-acrylamido-2-methylpropanesulfonic acid, 2-hydroxyethyl acrylate, acrylamide, N,N'-dimethylacrylamide, or 2-(dimethylamino)ethyl methacrylate.

4. The composition of claim 1, wherein the second block comprises one or more of methyl acrylate, tert-butyl acrylate, butyl acrylate, 2-ethylhexyl acrylate, dodecyl acrylate, stearyl acrylate, or styrene.

5. The composition of claim 1, wherein the amphiphilic block copolymer has a molecular weight between 1,000 and 10,000 g/mol.

6. The composition of claim 1, wherein the first block has from 5 to 150 repeating units and the second block has from 5 to 150 repeating units.

7. The composition of claim 1, wherein the acid comprises one or more of an organic acid or an inorganic acid.

8. The composition of claim 1, wherein the acid comprises one or more of hydrochloric acid, sulfuric acid, nitric acid, phosphoric acid, hydrofluoric acid, hydrobromic acid, perchloric acid, fluoroboric acid, formic acid, acetic acid, citric acid, lactic acid, sulfamic acid, or chloroacetic acid.

9. The composition of claim 1, wherein a concentration of the amphiphilic block copolymer is in a range of up to 70 gpt.

* * * * *